United States Patent
Mudge, Jr. et al.

(10) Patent No.: US 6,719,186 B2
(45) Date of Patent: Apr. 13, 2004

(54) METHOD AND APPARATUS FOR END-TO-END WELDING OF LINED PIPE

(75) Inventors: J. Krist Mudge, Jr., Spring, TX (US); Joseph William Randazzo, Jr., Sun City, CA (US)

(73) Assignee: Weldshield Development, N.V., Caracao (AN)

( * ) Notice: Subject to any disclaimer, the term of this patent is extended or adjusted under 35 U.S.C. 154(b) by 0 days.

(21) Appl. No.: 10/092,148

(22) Filed: Mar. 6, 2002

(65) Prior Publication Data

US 2002/0125295 A1 Sep. 12, 2002

Related U.S. Application Data

(60) Provisional application No. 60/273,658, filed on Mar. 6, 2001.

(51) Int. Cl.$^7$ .......................... B23K 9/028; B23K 37/06
(52) U.S. Cl. .......................... 228/215; 228/175; 228/50; 228/49.3; 219/158
(58) Field of Search ................................ 228/175, 215, 228/50; 219/160, 158; 285/55, 370, 417

(56) References Cited

U.S. PATENT DOCUMENTS

| | | | | |
|---|---|---|---|---|
| 2,820,427 A | * | 1/1958 | Chyle et al. | 228/50 |
| 2,916,001 A | * | 12/1959 | Chyle et al. | 228/216 |
| 3,286,341 A | * | 11/1966 | Miller | 228/175 |
| 3,365,566 A | * | 1/1968 | Kuder | 219/160 |
| 3,633,813 A | | 1/1972 | Looney et al. | |
| 3,765,665 A | | 10/1973 | Work | |
| 3,979,041 A | | 9/1976 | Kaneyama et al. | |
| 4,201,326 A | | 5/1980 | Connell | |
| 4,556,240 A | | 12/1985 | Yoshida | |
| 4,913,465 A | | 4/1990 | Abbema et al. | |
| 5,001,320 A | * | 3/1991 | Conley et al. | 219/61 |
| 5,104,152 A | | 4/1992 | Galfant | |
| 5,248,080 A | | 9/1993 | Stapleton | |
| 5,395,142 A | * | 3/1995 | Horn et al. | 285/288.5 |
| 5,547,228 A | | 8/1996 | Abbema et al. | |
| 5,566,984 A | * | 10/1996 | Abbema et al. | 285/22 |

OTHER PUBLICATIONS

Rice Engineering, Inc. Leaflet "Duoweld Coupling—For DuoLine 20 and Cement Lining", Oct., 1993.
CCB International Inc. Brochure, "Manufacturers of the Patented CCB Pipe Fitting." 1998.

* cited by examiner

Primary Examiner—Kiley Stoner
(74) Attorney, Agent, or Firm—Gary L. Bush; Andrews Kurth LLP

(57) ABSTRACT

A weld shield device for facilitating end-to-end welding of two pipe segments having fiberglass liners. The weld shield device includes an insulation material applied about the outer surface of a sleeve body. The sleeve body helps establish a welding gap between the two pipe segments. The insulation material reduces the heat transfer from the welding operations to the fiberglass liners. Additionally, a method of joining two pipe segments with fiberglass liners is provided, which includes connecting a first end of a weld shield device to a first pipe segment and connecting a second pipe segment to the second end of the weld shield device with the weld shield device being partially in a cutout portion of the fiberglass liner. Then, the two pipe segments are welded together. Insulation material on the weld shield device reduces the heat transfer from the welding operations to the fiberglass liners.

14 Claims, 2 Drawing Sheets

METHOD AND APPARATUS FOR END-TO-END WELDING OF LINED PIPE

RELATED APPLICATION

This application claims priority from U.S. Provisional Application Ser. No. 60/273,658, filed on Mar. 6, 2001.

BACKGROUND OF THE INVENTION

1. Field of the Invention

This invention relates generally to the welding of two ends of steel pipe together, and particularly to welding of pipe ends together where the pipe is lined with fiberglass.

2. Description of Prior Art

Corrosion in oil and gas pipelines and flow lines continues to be a problem. The most common prevention technique for internal corrosion in the oil and gas industry at this time is coating the inside of the pipe with commercially available plastic or cement. Plastic or cement linings for pipe have proven to be not durable enough during "pigging" operations to prevent damage of the lining and subsequent corrosion of the pipe.

A proven method of preventing corrosion in down hole applications is to line the pipe with glass reinforced epoxy (GRE), or fiberglass liners. Segments of down hole pipe are coupled together with threaded connections. Nevertheless, pipe segments lined with fiberglass for pipeline use must be welded end to end to form the pipeline. Specialized welding techniques have been required to weld fiberglass lined segments together.

Conventional welding techniques commonly used in the pipeline industry damage the fiberglass liners of the pipe. The heat generated by the weld greatly exceeds the working temperature of the liners.

Another concern of welding two pipe end segments together concerns alignment of the two pipes being welded.

A prior method used for welding fiberglass lined pipes without damaging the liners employs a sleeve manufactured by RICE ENGINEERING CORPORATION. The sleeve, called a DUOWELD sleeve, is welded to the pipe's outside diameter prior to the lining operation. A special coupling with a corrosion barrier ring is also provided. DUOWELD sleeves allow an air gap between the outer weld of the sleeves and the coupling. The coupling includes a corrosion barrier ring to provide a continuous corrosion resistant surface on the inside of the lined pipe and coupling.

This prior RICE ENGINEERING method requires pre-welded sleeves and a coupling welded in the field. The two pipes must be "jacked" together to allow a significant amount of compression on the corrosion barrier ring. The DUOWELD product requires a total of four welds on each assembly. Two welds are performed on the sleeves, on each end of the pipe prior to the lining operation. Two additional welds are required to join the sleeves and the coupling after the jacking operation. Although the RICE ENGINEERING method has certain advantages, it has disadvantages of excessive cost due to the additional weld sleeve requirements, and the "jacking" operation.

Another prior method for end-to-end welding of fiberglass lined pipe is provided by CCB INTERNATIONAL. The CCB method utilizes an internal sleeve or fitting that fits inside of the pipe. The sleeve has an insulation material fitted over a PTFE (glass reinforced Teflon), or corrosion resistant alloy (CRA) tube. The inner tube has seal rings which engage the inside diameter of the liner. The sleeve significantly reduces the inside diameter of the joined pipe segments in the connector/weld area. Reduction of inside diameter at the connection is disadvantageous, because flow through the pipe is significantly restricted in the pipe joint area. Special procedures for tools such as pipeline inside diameter inspection tools, or other tools referred to as pipe line "pigs," are also required. There are concerns about the weld quality, because there are two different materials potentially in contact with the weld.

A common concern during welding operations is the alignment of the two pipes being welded together.

3. Identification of Objects of the Invention

A primary object of the invention is to provide a method and apparatus to weld fiberglass lined pipe segments end-to-end in the field using normal welding procedures.

Another object of the invention is to provide a method and a device for welding fiberglass lined pipe segments end-to-end where only one weld is necessary as compared to the multiple welding steps required when using the DUOWELD sleeve.

Another object of the invention is to provide a method and a device for welding fiberglass lined pipe segments end-to-end where ordinary welding procedures are used as compared to special welding procedures as required in the CCB method.

Another object of the invention is to provide a weld shielding device that protects the fiberglass lining when fiberglass lined pipe segments are welded end-to-end, where the device acts as a centralizer for aligning the two pipe segments together.

Another object of the invention is to provide a weld shielding device that provides a substantially smooth inside diameter of fiberglass lined pipe where the inside diameter has no weld beads or weld splatter common in normal welding operations.

Another object of the invention is to provide a weld shielding device and method for welding fiberglass lined pipe segments end-to-end to provide a substantially smooth transition of the inside diameter across the joining area of the pipe segments so that pigging operation problems of the joined pipe segments are reduced as compared to pigging operations through fiberglass lined pipe segments joined by prior methods and devices.

Another object of the invention is to provide a weld shield device which functions as a spacer for the weld, thereby eliminating the need for tack welding prior to a root weld pass.

Another object of the invention is to provide a device which shields the fiberglass linings of opposed end-to-end segments of fiberglass lined pipes from the high temperature of the weld.

Another object of the invention is to provide a weld shield device to reduce the cost of joining fiberglass lined pipe end-to-end as compared to the CRA tube of CCB INTERNATIONAL.

SUMMARY OF THE INVENTION

The objects identified above as well as other features and advantages are incorporated in a weld shield device that facilitates the welded connection of two pipe segments having fiberglass liners. The weld shield device includes commercially available insulation material applied about the outer surface of a sleeve body. The sleeve body is arranged and designed in coordination with the end profiles of the pipes to be joined to help establish a welding gap between the two pipe segments, and the insulation material reduces the transfer of heat from the welding operations to the fiberglass liners. The weld shield device has end profiles that allow it to couple with the ends of the pipe segments. In this coupling, the weld shield device at least partially occupies a cutout portion of the fiberglass liner.

In a first embodiment of the invention, a long neck of the weld shield device fits in a cutout portion between a fiberglass lining and the pipe segment. A short neck of the weld shield device fits radially inwardly of the end of the fiberglass lining to protect and provide a substantially smooth transition across the joining area. The end of the fiberglass lining of a pipe segment fits within a groove defined by the two necks.

In a second embodiment of the invention, the weld shield device couples with an adhesive material surface and a fiberglass-lining surface. A short neck of the weld shield device fits radially inwardly of the end of the fiberglass lining to protect and provide a substantially smooth transition across the joining area.

BRIEF DESCRIPTION OF DRAWINGS

The invention will be described by reference to the drawings of which.

DESCRIPTION OF THE INVENTION

Figure 1:
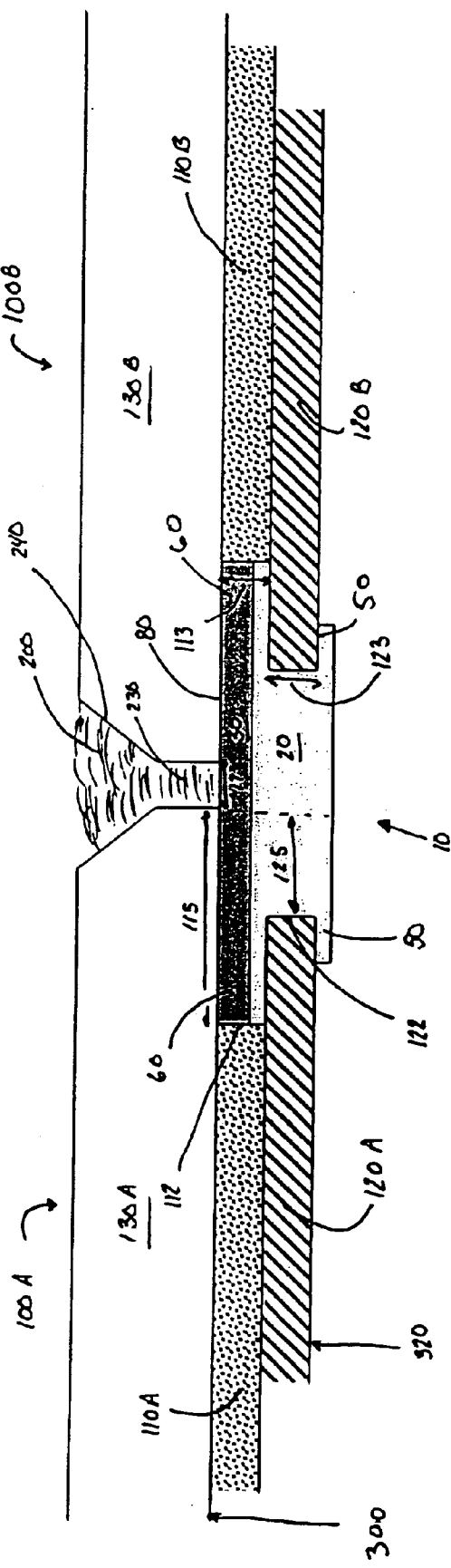
FIG. 1 is a one-half cross-section of two pipe sections which are lined with fiberglass lining and have been welded end to end together while using a weld shield device according to a first embodiment of the invention.

The invention is defined by the claims attached hereto with FIG. 1 illustrating one embodiment of the invention showing a weld shield device 10 facilitating the connection of two pipe segments (100A, 100B) using weld material 200 and conventional welding procedures. The two pipe segments (100A, 100B) include steel pipes (130A, 130B) which are lined with fiberglass linings (120A, 120B), which are secured to the pipes with adhesive material (110A, 110B). (The Figures are not to scale, and dimensions are exaggerated for clarity.)

Prior to installation of the weld shield device 10 in FIG. 1, the pipe segments (100A, 100B) ends are prepared for the welding operations by first removing the ends of the fiberglass lining (120A, 120B) from the end of a pipe segment (100A, 100B) by a length 125. Next, the adhesive material (110A, 110B) is removed between the fiberglass lining (120A, 120B) and the inside diameter 300 of the pipe segment (100A, 100B) by a length 115.

Figure 2:
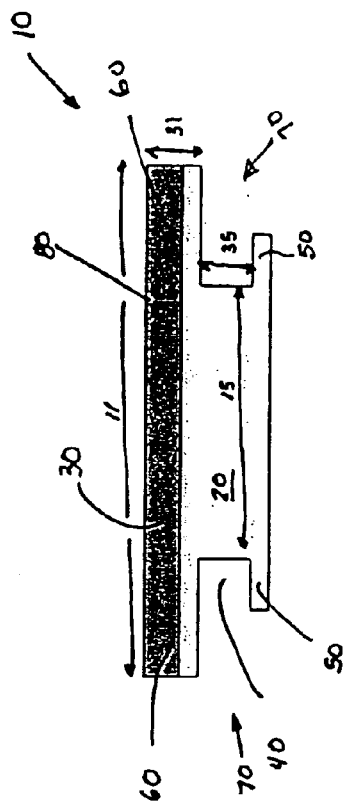
FIG. 2 is a one-half cross-section of the weld shield device of FIG. 1.

Referring to FIGS. 1 and 2, the weld shield device 10 includes a sleeve body 20 and insulation material 30 lapped about the outside diameter of the sleeve body 20. A pair of long necks 60 and short necks 50 extend outwardly axially from the body 20 of weld shield device 10. A groove 40 is defined on each side of the weld shield device 10 between the long necks 60 and short necks 50. The long necks 60, short necks 50, and grooves 40 make up the end profiles 70. A profile 70 is provided on opposite ends of the device 10. The end profile 70 is designed to compliment the characteristics of the prepared pipe segment (100A, 100B). For example, long neck 60 fits within the cutout portion between the fiberglass lining 120A and the pipe segment 100A where the adhesive material has been removed, and the groove 40 accepts the protrusion of fiberglass lining (120A, 120B). Correspondingly, the radial thickness 31 of the long neck 60 is slightly smaller than the radial thickness 113 of the adhesive material (110A, 110B), and the thickness 123 of the fiberglass linings (120A, 120B) is slightly smaller than the thickness 35 of the groove 40. The end profile 70 in combination with the profile of the prepared pipe segments (100A, 100B) helps to centralize the joint during welding operations.

The dimensions of the weld shield device 10 are designed to allow the weld shield device 10 to act as a spacer. When pipe segment 100A and pipe segment 100B are coupled to the weld shield device 10, a weld gap 230 of a predetermined length 17 exists. The weld gap 230 is primarily created via the relationship between the sleeve body 20 and the cutout portion of fiberglass liners (120A, 120B). That is, when the groove 40 contacts the fiberglass liners (120A, 120B) at a mating surface 122, the contact of the liners in the groove 40 prevents the pipe segments (100A, 100B) from moving any closer together to one another. In the embodiment of FIG. 1, the length 15 of the sleeve body 20 is approximately the same size as cutout portion length 125 of fiberglass liner 120A, cutout portion length 125 of fiberglass liner 120B, and predetermined length 17 of weld gap 230. The mating of the long necks 60 with the ends of adhesive material (110A, 110B) at mating surface 112 can, also aid in creating the weld gap 230. The length 11 of the outer side 80 of the weld shield device 10 is approximately the same length as the sum of cutout portion length 115 of adhesive material 110A, cutout portion length 115 of adhesive material 110B, and predetermined length 17 of weld gap 230.

The insulation material 30 is any one of many commercial materials which are known to those skilled in the art. The insulation material is a silica matrix, preferably UNIFRAX® brand of sticky putty from UNIFRAX Corporation. Such insulation material prevents transfer of heat from the welding operation at gap 230 to the fiberglass portions 120A, 120B. Preferably, as shown in the embodiment of FIG. 1, the insulation material 30 spans the entire distance of the outer side 80 of the weld shield device 10.

The sleeve body 20 is preferably designed to withstand corrosion and is durable enough to withstand pigging operations. It can be made of CRA material, composite material, solid insulating material, or the like.

The method for joining the two ends of the pipe segments of FIG. 1 begins after the ends of the pipe segments (100A, 100B) have been prepared as described above, by installing the weld shield device 10 on the end of one pipe segment, e.g. 100A. The weld shield device 10 mates with the fiberglass lining 120A at mating surface 112 and the adhesive material 110A at mating surface 122 allowing the outer side 80 of the weld shield device to lie adjacent to piping 130A. If desired, the weld shield device 10 can be fixed in place using an epoxy resin, sealant material, or the like. Next, pipe segment 100B is installed onto the other end of the weld shield device 10 in a similar manner. Once again, if desired, an epoxy resin, sealant material, or the like can be used to help fix the weld shield device 10 in place.

After connection of the two pipe segments (100A, 100B), conventional welding is performed using weld material 200. The embodiment of FIG. 1 shows the pipe segments (100A, 100B) with weld preparation angles 240. These weld preparation angles 240 create a welding area that is in communication with the weld gap 230. As previously mentioned, the dimensions of the weld shield device 10 create the weld gap 230 between the pipe segments (100A, 100B). The end profile 70 of the weld shield device 10 having a complimentary profile to prepared pipe segments (100A, 100B) helps centralize and stabilize the pipe during welding operations. Additionally, the insulation material 11 of the weld shield device 10 reduces transfer of thermal energy from welding operations to the fiberglass linings (120A, 120B) of the two pipe segments (100A, 100B).

Figure 3:
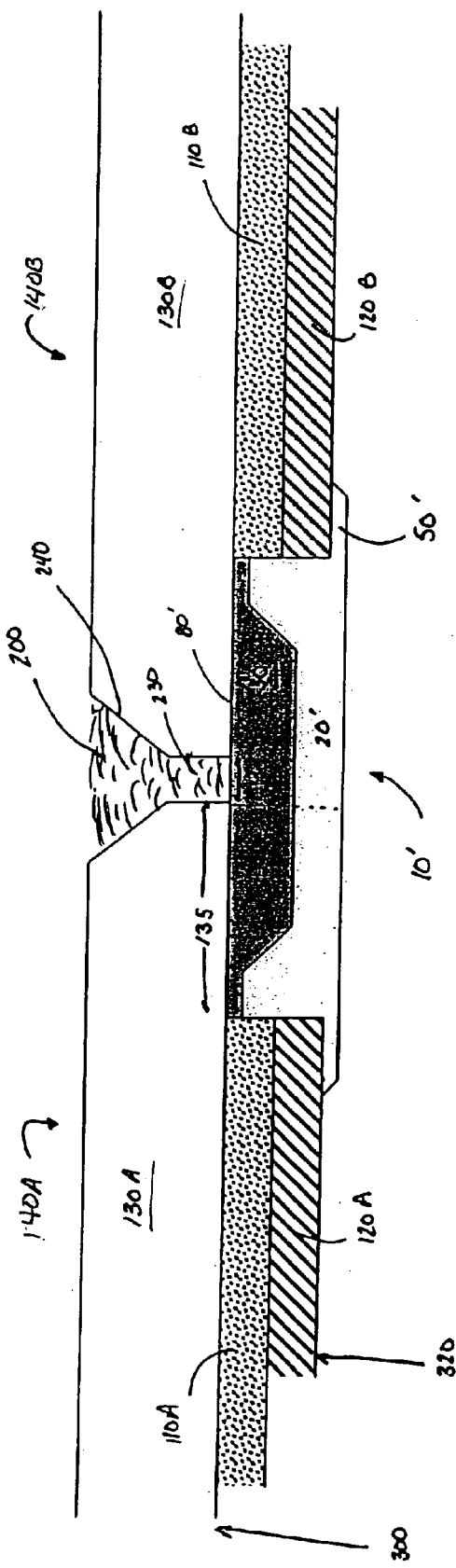
FIG. 3 is a one-half cross-section of two pipe sections which are lined with fiberglass lining prior to welding end-to-end with a weld shield device according to a second embodiment of the invention.
Figure 4:
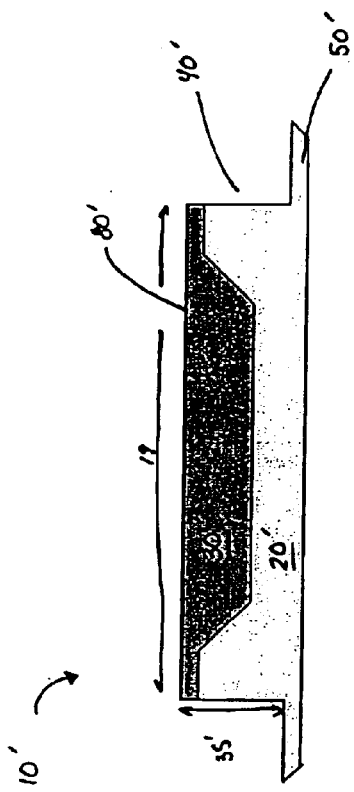
FIG. 4 is a one-half cross-section of the weld shield device of FIG. 3.

FIGS. 3 and 4 illustrates a second embodiment of the invention showing a similar arrangement to that of FIG. 1, but with the weld shield device 10' in an alternative configuration and with a correspondingly different preparation of pipe segments (100A, 100B).

Similar to FIG. 1, prior to the installation of the weld shield device 10', the pipe segment ends (140A, 140B) are prepared. However, a length 135 is removed from both the adhesive material (110A, 110B) and fiberglass lining (120A, 120B).

Referring to FIGS. 3 and 4, the details of the alternatively configured weld shield device 10' can be seen. The insulation material 30' is lapped about sleeve body 20'. The insulation material 30' is thicker in a central portion of the weld shield device 10'. To keep a constant thickness 35' in the weld shield device 10', the sleeve body 20' is correspondingly thinner in the central portion than that shown in the embodiment of FIG. 2. The preferred material of sleeve body 20' is stainless steel or a composite. The shoulder 40' is dimensioned to compliment the removal of length 135 of the adhesive material (110A, 110B) and fiberglass lining (120A, 120B). The short neck 50' is disposed radially inwardly around the adhesive material 120A. The short neck 50' is designed to extend around the fiberglass linings (120A, 120B) to help protect the insider diameter 320 of the fiberglass liners (120A, 120B) and the end of the fiberglass liners (120A, 120B). Preferably, the short neck 50' makes only a small radial intrusion into the inside the diameter 320 of the fiberglass linings (120A, 120B) thereby facilitating smooth, uninterrupted flow in the joint area. The length 19 of weld shield device 10' helps create weld gap 230: that is, the length 19 is roughly the same size as the cutout portion length 135 of adhesive material 110A/fiberglass lining 120A, cutout portion length 135 of adhesive material 110B/fiberglass lining 120B, and predetermined length 17 of weld gap 230.

Similar to the embodiment of FIG. 1, the method for joining the two ends of the pipe segments of FIG. 3 begins after the ends of the pipe segments (100A, 100B) have been prepared by installing the weld shield device 10' of pipe segment, 100A. The weld shield device 10' mates against the fiberglass lining 120A and adhesive material 110A while the outside end 80' lies adjacent to the pipe 130A. If desired, the weld shield device 10 can be fixed in place using an epoxy resin, sealant material, or the like. Then, the other pipe segment 100B is installed on the other end of weld shield device 10' in a similar manner.

After connection of the two pipe segments (100A, 100B), conventional welding is performed using weld material 200 in a manner similar to that of FIG. 1.

It should be understood that the invention is not limited to the exact details of construction, operation, or embodiments shown and described, as obvious modifications and equivalents will be apparent to one skilled in the art. For example, while preparation of the pipe segments (100A, 100B) is described as directly preceding installation of the weld shield device 10 or 10', the pipe preparation can occur in the manufacturing stages of the pipe segments (100A, 100B). Also, while the weld shield device (10 or 10') is described as aiding in creating a weld gap 230, such a description should not be interpreted as precluding the use of another device to aid in establishing the weld gap 230. In other words, in some embodiments of the invention, an additional device may be used. Accordingly, the invention is therefore limited only by the scope of the claims.

We claim:

1. In the connection of two pipe segments via welding operations, wherein the two pipes segments have fiberglass linings, a method for reducing the transfer of heat from said welding operations to said fiberglass linings comprising:

coupling a first end of a weld shield device to a first pipe segment of said two pipe segments, wherein said weld shield device includes an insulation material and a sleeve body and wherein grooves on opposite ends of said weld shield device mate with ends of fiberglass liners of said two pipe segments;

coupling a second pipe segment of said two pipe segments to a second end of said weld shield device, wherein said sleeve body creates a welding gap between said two pipe segments, and wherein said weld shield device at least partially occupies a cutout portion of said fiberglass linings; and welding the two pipe segments together at said welding gap, said insulation material reducing heat from transferring from said welding operations to said fiberglass linings.

2. The method of claim 1, wherein said sleeve body includes short necks which fit around said fiberglass liners.

3. The method of claim 1, wherein said insulation material covers the entire length of an outside portion of said weld shield device.

4. The method of claim 2, wherein said fiberglass lining is maintained in place using adhesive material, and wherein said weld shield device includes long necks which axially extend inwardly into said cutout portions of said adhesive material of said two pipe segments beyond mating surfaces of ends of said fiberglass liners and said grooves of said sleeve body.

5. In the connection of two pipe segments via welding operations, wherein the two pipes segments have fiberglass linings, a method for reducing the transfer of heat from said welding operations to said fiberglass linings comprising:

removing a portion of said fiberglass liners from said two pipe segments to create a cutout portion of said fiberglass liners, said cutout portion of said fiberglass liners having a complimentary profile to an outer profile of said weld shield device, coupling a first end of a weld shield device to a first pipe segment of said two pipe segments, wherein said weld shield device includes an insulation material and a sleeve body;

coupling a second pipe segment of said two pipe segments to a second end of said weld shield device, wherein said sleeve body creates a welding gap between said two pipe segments, and wherein said weld shield device at least partially occupies said cutout portions of said fiberglass linings; and welding the two pipe segments together at said welding gap, said insulation material reducing heat from transferring from said welding operations to said fiberglass linings.

6. In the connection of two pipe segments via welding operations, wherein the two pipes segments have fiberglass linings, a method for reducing the transfer of heat from said welding operations to said fiberglass linings comprising:

providing the two pipe segments with each pipe segment having a removed portion of said fiberglass liners which is complimentary to an outer profile of a weld shield device.

coupling a first end of said weld shield device to a first pipe segment of said two pipe segments, wherein said weld shield device includes an insulation material and a sleeve body;

coupling a second pipe segment of said two pipe segments to a second end of said weld shield device, wherein said sleeve body creates a welding gap between said two pipe segments, and wherein said weld shield device at least partially occupies said cutout portions of said fiberglass linings; and welding the two pipe segments together at said welding gap, said insulation material reducing heat from transferring from said welding operations to said fiberglass linings.

7. A weld shield device arranged and designed to facilitate the end-to-end connection of two pipe segments having fiberglass liners during welding operations, wherein said weld shield device is arranged and designed to at least partially occupy a cutout portion of said fiberglass liners comprising:

a sleeve body arranged and designed to couple with said fiberglass liners, wherein said sleeve body in coupling with said fiberglass liners of said two pipe segments has a length such that a welding gap is created between said two pipe segments, and insulation material is coupled to said sleeve body, wherein said insulation material reduces heat from being transferred from said welding operations to said fiberglass liners.

8. The weld shield device of claim 7, wherein said weld shield device includes short necks which extend radially inwardly of the end of said liners.

9. The weld shield device of claim 7, wherein said insulation material covers the entire length of an outside portion of the weld shield device.

10. The weld shield device of claim 9, wherein said outside portion includes long necks which extend axially inwardly into a cutout portion of adhesive material of said two pipe segments, each of said necks extending past a mating surface between said fiberglass liners and a groove of said sleeve body in a cutout portion of adhesive material of said pipe segments.

11. A weld shield device arranged and designed to facilitate end-to-end connection of two pipe segments having fiberglass liners during welding operations, wherein said weld shield device is arranged and designed to at least partially occupy a cutout portion of said fiberglass liners comprising:

a sleeve body having a complimentary profile to fiberglass cutout portions of said two pipe segments, wherein said sleeve body is arranged and designed to couple with said fiberglass liners at a mating surface, wherein said sleeve body includes short necks which fit around the ends of said liners, and wherein said sleeve body in coupling with said fiberglass liners of said two pipe segments has a length such that a welding gap is created between said two pipe segments, and an insulation material coupled to said sleeve body, wherein said insulation material covers the entire length of an outside end of the weld shield device, and wherein said insulation material reduces heat from being transferred from said welding operations to said fiberglass liners.

12. The weld shield device of claim 11, wherein said fiberglass lining is maintained in place using adhesive material, and wherein said weld shield device includes long necks which axially extend into said two pipe segments past said mating surface between said fiberglass liners and said sleeve body in a cutout portion of said adhesive material.

13. A weld shield device (10,10') arranged and designed to facilitate end-to-end welding of two pipe segments (130A, 130B) each having a liner (120A, 120B) placed therein, wherein said liners each have a cut out portion length (125, 135) as measured from an end of said liner to an end of a respective pipe segment, the device comprising, a sleeve body (20, 20') having an outer surface and having an axial length which is greater than twice said cut out portion length, wherein said body is arranged and designed to contact ends of said liners of said two pipe segments such that a welding gap (23) is created between said ends of said two pipe segments, and insulated material (30) is provided around a said outer surface of said sleeve body.

14. The weld shield device (10, 10') of claim 13 wherein, said insulation material is provided around the entire axial length of said outer surface.

* * * * *